March 12, 1929.  B. D. CHAMBERLIN  1,704,789
ROLL HOLDER FOR PHOTOGRAPHIC CAMERAS
Original Filed Jan. 29, 1921  5 Sheets-Sheet 1
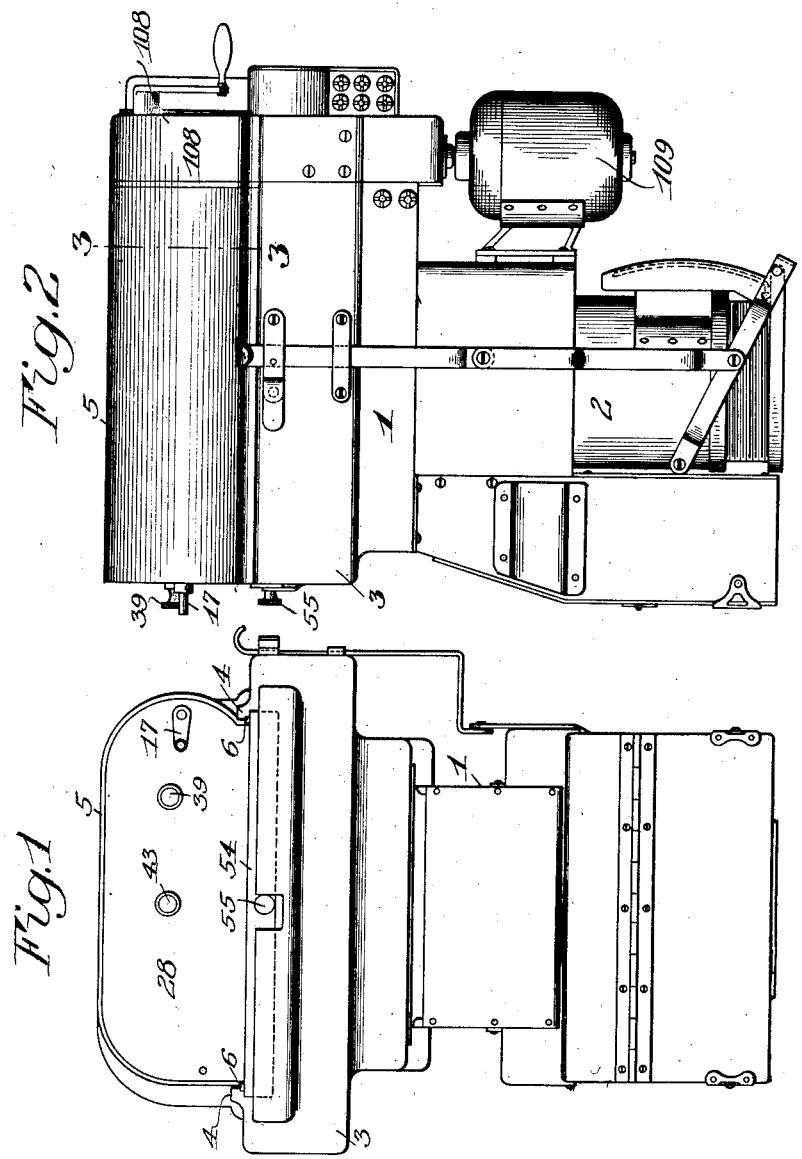
INVENTOR.
Benjamin D. Chamberlin
BY
his ATTORNEY March 12, 1929.　　B. D. CHAMBERLIN　　1,704,789
ROLL HOLDER FOR PHOTOGRAPHIC CAMERAS
Original Filed Jan. 29, 1921　　5 Sheets-Sheet 2
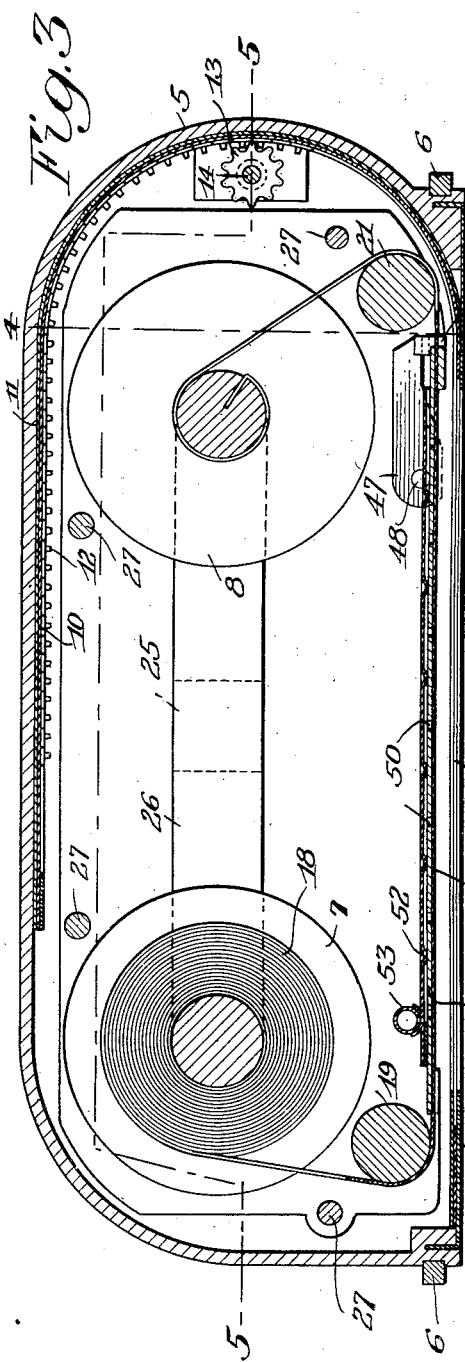
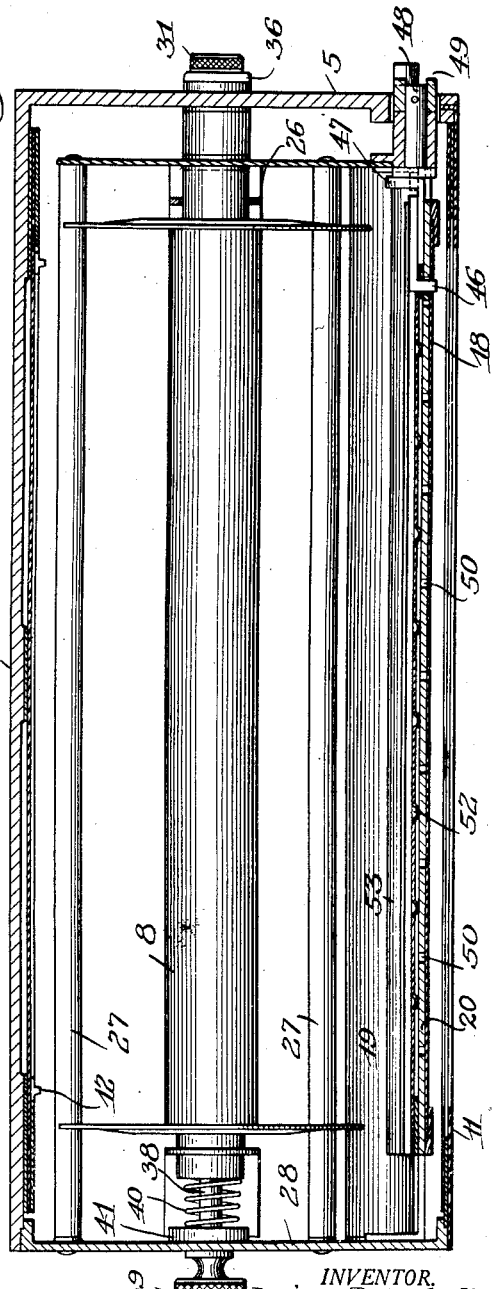
INVENTOR.
Benjamin D. Chamberlin
BY
his ATTORNEY March 12, 1929.  B. D. CHAMBERLIN  1,704,789
ROLL HOLDER FOR PHOTOGRAPHIC CAMERAS
Original Filed Jan. 29, 1921   5 Sheets-Sheet 3
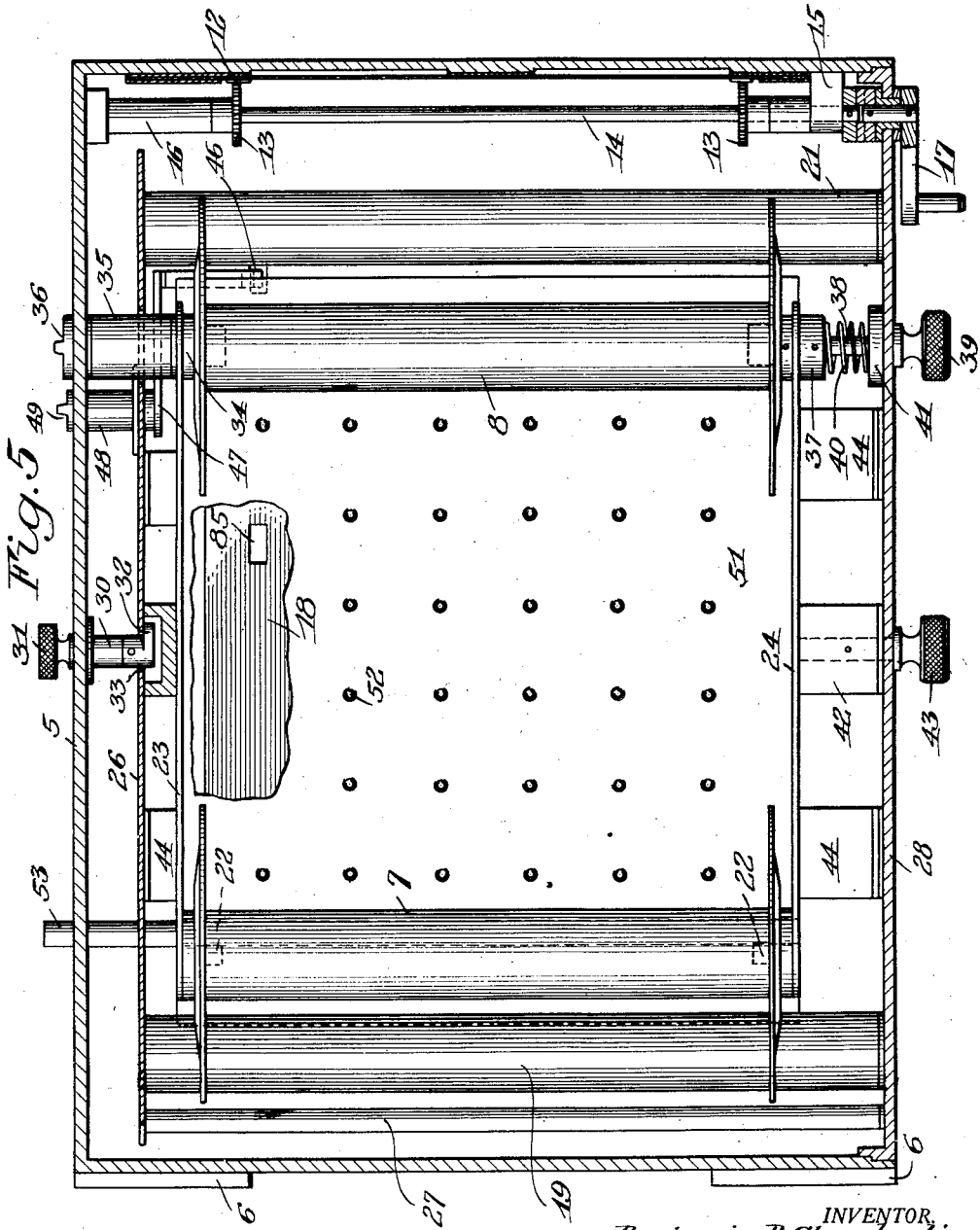
INVENTOR
Benjamin D. Chamberlin
BY
his ATTORNEY

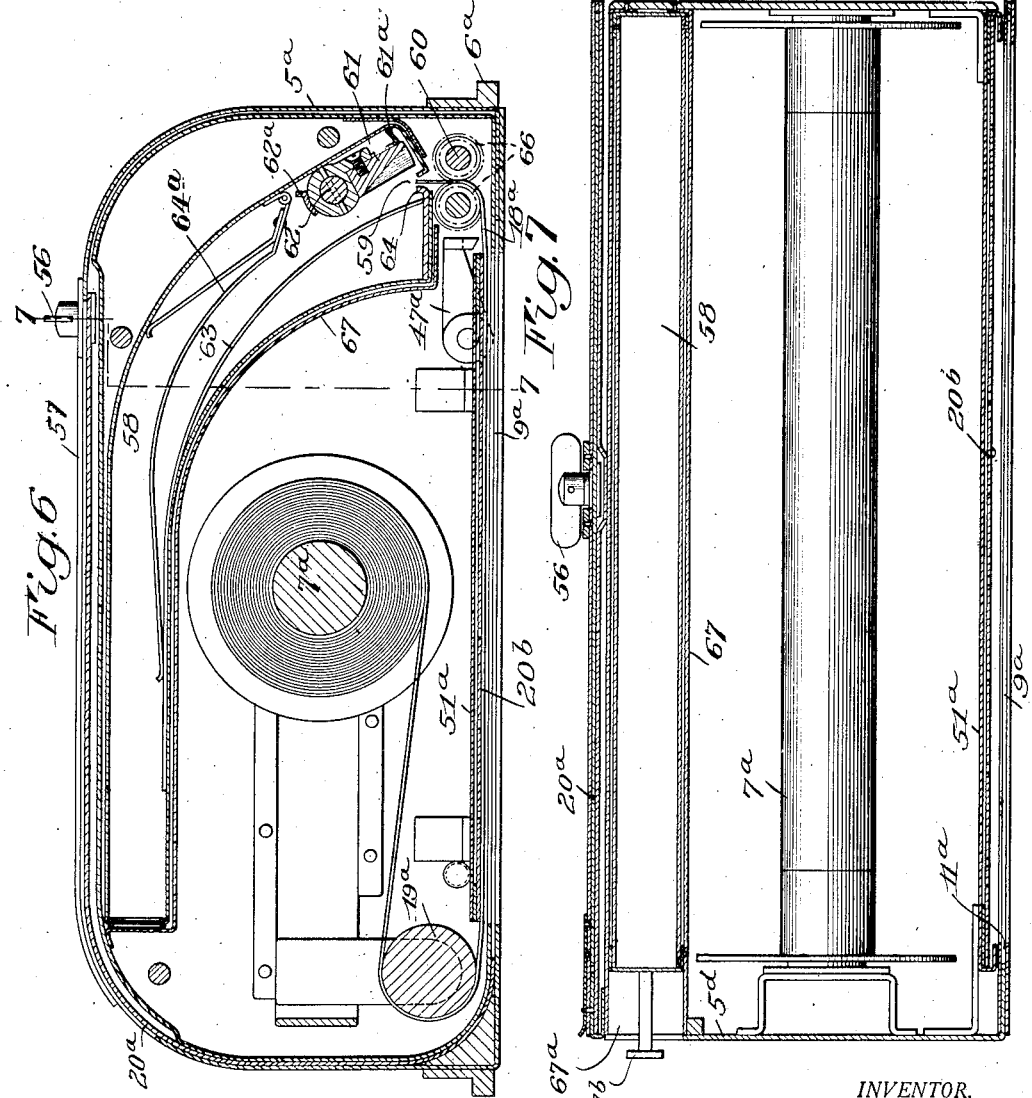

March 12, 1929.    B. D. CHAMBERLIN    1,704,789
ROLL HOLDER FOR PHOTOGRAPHIC CAMERAS
Original Filed Jan. 29, 1921    5 Sheets-Sheet 5
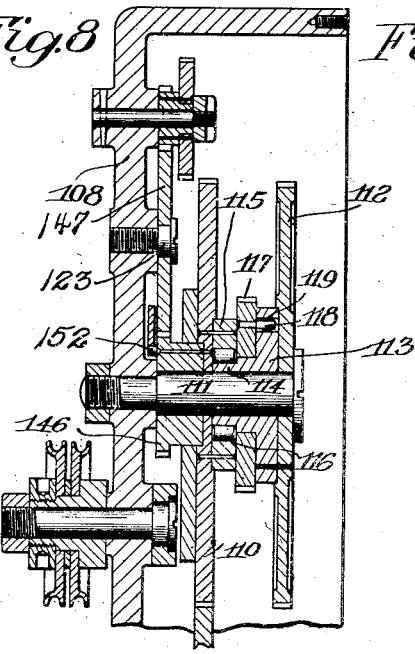
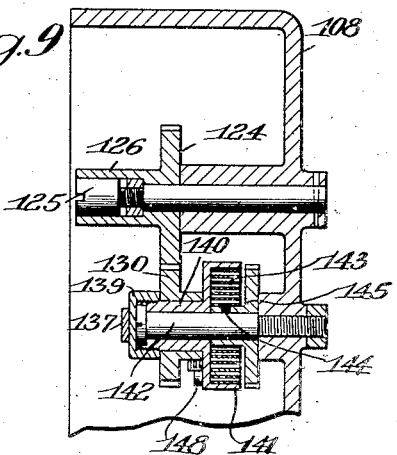
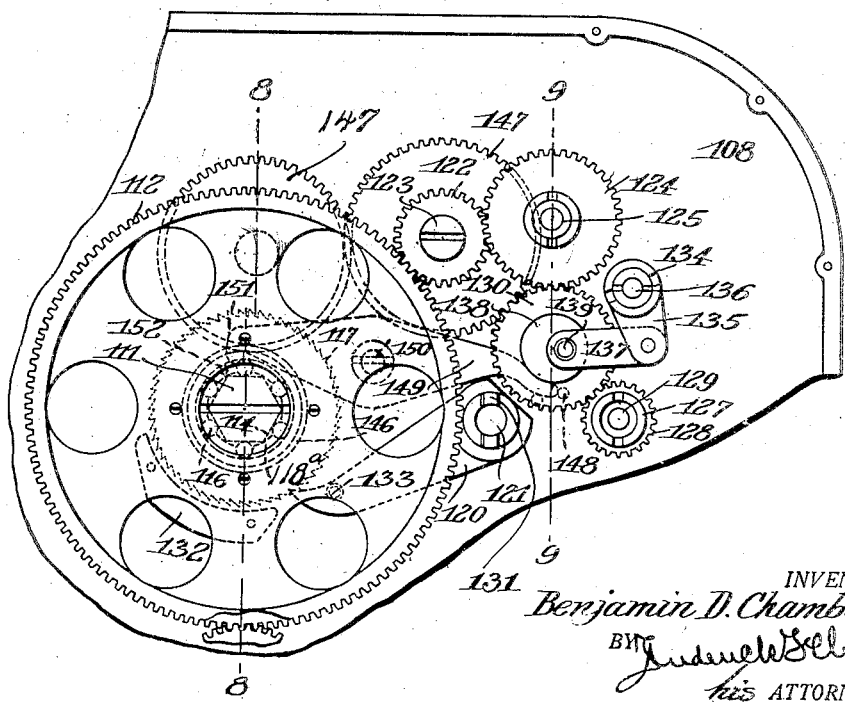
INVENTOR.
Benjamin D. Chamberlin
BY
his ATTORNEY Patented Mar. 12, 1929.

1,704,789

UNITED STATES PATENT OFFICE.

BENJAMIN D. CHAMBERLIN, OF ROCHESTER, NEW YORK, ASSIGNOR TO EASTMAN KODAK COMPANY, OF ROCHESTER, NEW YORK, A CORPORATION OF NEW YORK.

ROLL HOLDER FOR PHOTOGRAPHIC CAMERAS.

Original application filed January 29, 1921, Serial No. 440,908. Divided and this application filed June 27, 1923. Serial No. 648,142.

My present invention relates to photography and more particularly to photographic cameras and it has for its object to provide an improved roll holder and film feeding device for such cameras that will be simple in construction and efficient in operation. The improvements are directed in part toward means for winding the film, for locking it in adjusted position and for cutting it into lengths when required together with general features incident to connecting the roll holder with the camera and coupling driving devices on the camera with moving elements of the roll holder. To these and other ends the invention resides in certain improvements and combinations of parts all as will be hereinafter more fully described, the novel features being pointed out in the claims at the end of the specification.

In the drawings:

Figure 1 is a side view of an automatic aerial camera constructed in accordance with and embodying my present invention.

Figure 2 is an end or rear view of the camera.

Figure 3 is a vertical section, enlarged, through the roll holder on the line 3—3 of Figure 2.

Figure 4 is a transverse section of the same roll holder on the line 4—4 of Figure 3.

Figure 5 is a horizontal section on the line 5—5 of Figure 3.

Figure 6 is an enlarged vertical section through another form of film feeding means fitted within the same roll holder.

Figure 7 is a section on the line 7—7 of Figure 6.

Figure 8 is an enlarged sectional view through the film driving gearing taken on the line 8—8 of Figure 10.

Figure 9 is another sectional view of another portion of said gearing taken on the line 9—9 of Figure 10, and Figure 10 is an elevation of said gearing showing a fragment of the gear case.

Similar reference numerals throughout the several views indicate the same parts.

My present improvements are particularly applicable to automatic cameras of the type disclosed in my prior pending application, Serial Number 440,908, filed January 29, 1921, of which this is a division. As therein fully described, I provide a camera body disposed, in aerial work, with its optical axis vertical and fitted at the top with a detachable light-tight roll holder that may be either of a type in which a roll of film is exposed and rewound into a roll or one in which a roll of film is exposed and the exposed areas immediately severed and stored in a dark chamber as separate sheets. A vacuum producing means holds the film flat in the focal plane during exposure through a focal plane curtain shutter and exposure identification means are employed that print upon the margin of the film desired information as to the conditions under which the photographs were made such as altitude, direction, etc.

The foregoing operations, properly synchronized, are effected through a unitary driving and controlling mechanism embodying a motive power operating continually at uniform speeds. In regulatable connection with this motive power is a cycle member one revolution of which either actuates, trips, or stores energy in each of the various mechanisms, successively. Several of these secondary mechanisms are not directly actuated by the cycle member but by spring motors of their own which are tripped by the cycle member but rewound in preparation for the succeeding cycle and exposure. I have illustrated herein and will describe two forms of roll holders that may be used and so much of the automatic operating mechanism as is immediately concerned with the actuation thereof.

Referring more particularly to the drawings and to Figures 1 and 2 thereof, 1 indicates the main casing of the camera body having a tubular extension 2 at the bottom thereof carrying the lens and focusing devices. The upper enlarged portion 3 of the frame is fitted as shown in Figure 1 with ways 4 to receive a slidably detachable roll holder 5 having guides 6 cooperating with the ways 4. As before stated, I may use and have shown herein two types of roll holders that are interchangeable and each of which is adapted to slidably occupy ways 4. Referring first to the one shown in Figures 3, 4 and 5, this comprises a substantially rectangular casing 5 having rounded ends and containing a film supply roll 7 and a winding roll 8. The bottom of the casing contains an exposure opening 9 that may be closed to render the roll holder light-tight when removed from the camera by a sliding shutter 10 which is shown in the open position in Figures 3 and 4. This shutter is composed, in the present instance, of a thin, flexible, bronze plate, the edges of which slide in guides 11 at opposite sides of the exposure opening 9, which guides are shown in section in Figure 4 to consist of two outer plates secured to the bottom of the roll holder casing and an offset inner spacing plate of about the thickness of the shutter slide. These guides 11 extend beyond the opening 9 and up into the interior of the casing 5 around one end thereof so that the shutter 10, when open, may occupy the position shown in Figure 4.

To manipulate the shutter between its open and closed position, it is provided on its longitudinal edges just clear of the guides 11 with rack teeth 12, as shown in Figures 3 and 4 with which rack teeth mesh a pair of pinions 13 on a shaft 14 extending transversely of the casing and having bearings 15 and 16. The shaft is turned by means of a detachable hand crank 17 which appears in Figure 1 and, compared with Figures 3, 4 and 5, gives an idea of the position of the interior parts of the roll holder relatively to the camera. The crank is turned in opposite directions to open and close the exposure opening.

The film 18 is drawn from the supply spool 7 over a guide roller 19 and across the face of a film support or backing plate 20 in the focal plane of the camera lens and thence passes over another guide roll 21 and onto the winding roll 8 through which the operating force is applied. The supply spool 7 may be of the ordinary type and is shown in Figure 5, is supported on dead centers 22 carried at the ends of spring plates 23 and 24 that may be displaced to release the spool or permit its insertion in the ordinary way. The spring plate 23 is carried at its center by a block 25 on an inner frame piece 26 connected by brace rods 27 (and also the guide rolls 19 and 21) to the front or cover plate 28 of the casing 5 so that the interior parts of the roll holder may be withdrawn as one assembly upon the said cover plate 28. A rotary bolt 30 having a bearing in the opposite wall of the casing and an operating knob 31 on the exterior has an eccentric locking portion 32 that may be rotated into and out of engagement with the plate 26 through an opening 33 therein within a cavity of the block 25. The other end of the spring plate 23 carries a winding center 34 interlocking with one end of the winding spool 8 in the ordinary manner and detachably connected by a sleeve 35 with a coupling member 36 having a bearing in the rear wall of the casing 5 and projecting to the exterior thereof for connection to power driven devices hereinafter described. The opposite end of the winding spool 8 is also similarly detachably interlocked with a winding center 37 carried in the free end of the spring plate 24 and locked to a stem 38 extending through the cover plate 28 of the casing where it terminates in an exterior hand operated knob 39 the purpose of which is to permit turning the winding roll 8 by a hand for adjustments of the film such as that involved in threading the lead end upon the winding spool during loading.

The supply spool 7 is inserted or released by spreading the adjacent ends of the spring plates 23 and 24 while the winding spool 8 is manipulated in the same manner. To accommodate this movement to the hand winding stem 38, the latter has longitudinal movement in the cover plate 28 but is held in normal or engaging position by a spring 40 coiled about it and bearing at one end against the center member 37 and at the other against a felt washer 41 or similar device arranged to prevent light leaks through the bearing of the stem in the cover plate. The spring plate 24 is supported at its center on the cover plate 28 by a block 42 in which is secured the stem of an exteriorly arranged knob 43 provided as a handle for manipulating the roll holder and its guides, or the assembly of interior parts.

The brackets shown at 44 are supports for the film backing plates 20.

A fragment of the film 18 is shown in Figure 5 to contain a perforation 85 near one edge. These perforations are one picture length apart and as soon as the film has been wound through one picture area, the offset end 46 of a locking pawl or dog 47 drops into a perforation 85 permitting sufficient movement of the dog to release certain mechanism to be later referred to. The pivot 48 of the pawl or dog has a bearing in the frame piece 26 and terminates in a coupling member 49 on the exterior of the casing 5 which coupling member is adapted to be connected with the power driven parts to release the dog at proper times as will be hereinafter described.

It is obvious that the dog 47 may be used as a film locking dog to permit the feeding of the film only at proper times but in the present construction, the primary object of perforating the film at intervals is to allow clearance for a free and extended movement of the dog not possible when it is resting on the surface of the film and for the purposes of other mechanical effects that will be explained.

The film support or backing plate 20 has a multiplicity of perforations 50 and forms one wall of a thin wind chest 51, the opposite wall of which is spaced therefrom by indented protuberances 52. A pipe 53 communicating with the interior of the wind chest runs off laterally through the rear wall of the casing 5 and makes connection with a vacuum producing means which will not be described herein beyond stating that it functions in timed relation to the other mechanism to hold the film flat in its focal plane during the period of exposure.

A longitudinally sliding bolt shown at 54 in Figure 1 and provided with a knob 55 secures the roll holder in operative position and also acts as a light lock, but this is not shown and need not be described in detail.

The alternative form of roll holder is shown in Figures 6 and 7 and similarly comprises the casing 5ª fitted with guiding ribs 6ª to occupy the ways 4 on the camera. The provision of an exposure opening 9ª, guides 11ª, shutter 20ª, vacuum chest 51ª and locking dog 47ª is substantially the same with the exception that the means for operating the shutter slide 20ª consists of a winged finger-piece 56 secured to its rear end and projecting through a longitudinal slot 57 in the top of the casing. The reciprocations of this finger piece open and close the shutter slide.

Extending longitudinally at the top of and within the roll holder and transversely across one end thereof is a curved storage or dark chamber 58 for sheets of cut film. The entrance thereto is through a slot shaped opening 59 at its lower or curved end adjacent to and just above a pair of feed rollers 60 which draw the film 18ª across the backing plate 20ᵇ of the vacuum chest from a suitably mounted supply roll 7ª and over a guide roll 19ª. Within the lower end of the storage chamber 58 is a swinging shear or knife 61 on a rock shaft 62 and adapted to swing across the opening 59 and, in connection with a lip 64, sever a film length that has been wound into the chamber 58 by the feed rolls 60. The severed film, indicated at 63, occupies the natural curved position shown and thus successive cut films are pressed together by the swing of the knife which engages the topmost one behind the retaining lip 64 and by suitable zigzag follower spring 64ª. The end of the shaft 62 terminates outside of the casing 5ª in, or is otherwise connected to, an exterior coupling member not shown, similar to the coupling 49 and which is coupled with suitable actuating mechanism hereinafter described that operates the knife at the proper time in the cycle of operation of the camera. Similarly, one of the feed rollers 60 which are geared together at 66 to turn jointly in opposite directions, is connected to a coupling member on the exterior of the roll holder casing for a detachable connection with film driving mechanism hereinafter described.

The chamber 58 is an inner chamber formed by a suitably shaped container occupying an upper chamber of the roll holder constituted by a partition wall 67 that extends downwardly into proximity to the feed rolls 60. The said partition wall 67 extends to the exterior of the roll holder as shown in Figure 7 so that the the same forms an open chamber through the end of which, as indicated at 67ª, the container 58 may be withdrawn through the provision of a suitable handle 67ᵇ formed thereon if desired. When the container 58 is so withdrawn to develop the contained film or substitute a fresh container, the knife 61 is swung to a position in which it closes and seals the entrance slot 59 to protect the interior of the roll holder from light and for this purpose, the knife is provided with a felt lip 61ª. Similarly, a felt seal 62ª may be carried by the knife or its mounting on the opposite side of its shaft 62 to tightly engage the adjacent wall of the container 58 when the knife is in the intermediate position.

As before stated, the operation of these roll holding and film manipulating devices is conducted from a central, automatic controlling mechanism arranged within a gear case 108 (Figure 2) and driven by a motor 109, the said gear case being so arranged as to abut the end of the roll holder casing 9 or 9ª. Fragments of this case 108 with so much of the contained gearing as is directly connected with the film feeding means are shown in Figures 8, 9, and 10. The controlling mechanism embodies a large gear 110 on a stud 111 which large gear, with associated parts, constitutes the cycle member that controls the successive operations of the various camera mechanisms. It may be pointed out in passing that this cycle gear 110 is not the outer gear shown superposed upon it in Figure 10, but the gear disclosed by the breaking away of this outer gear and shown in the sections.

This outer gear 112, mounted on the outer end of the stud 111 has secured to it a hub 113 terminating in a hexagonal portion 114 arranged within a hub collar 115 on the cycle member 110. Clutch rollers 116 ride on these squared faces and lock the gear 112 to the cycle gear 110 in a manner well known with respect to clutches of this kind. There is similarly provided a ratchet 117 turning on the hub 113 and having a pin 118 engaged by a spring 119 within an annular segmental recess of the hub 113 to normally hold the clutch elements in engagement while projections 118ª on the ratchet, interposed between the clutch rollers, unseat them when the rotation of the ratchet is halted. In other words with the parts in normal positions, and the gear 112 held fixed by the resistance of its train, the spring 119 in its hub 113 acts on the pin 118 of the ratchet 117 to turn the latter slightly so that it will urge the clutch rollers 116 to the narrow ends of their cavities, and when the cycle gear 110 turns it will thus turn the hub 113 with it. When however the stop pawl 133 engages the ratchet 117 it compresses spring 118 and with the very slight relative movement that thus occurs between the ratchet and the hub 113 the projections on the ratchet carry the clutch rollers to neutral position and gear 112 is freed of its driving means. The ratchet is so arrested by a stop pawl 120 pivoted at 121. The gear 112 through a pinion 122 on a stud 123 drives a gear 124 on a stud 125 and, as shown in Figure 9, this gear 124 has a hub 126 terminating in a coupling adapted to cooperate with the projecting drive receiving coupling 36 of the continuous film roll holder shown in Figures 3, 4, and 5. Therefore, while the clutch 116 is in, the cycle member will tend to wind the film of this roll holder. Similarly, it will tend to wind the film of the cut film roll holder shown in Figures 6 and 7 if that is the one that is in use for the drive receiving coupling of the latter is received by a coupling member 127 on the hub of a gear 128 mounted on a stud 129 and driven from the gear 124 through an idler 130.

In either case, the film drive or winding action is relatively short and must be terminated after an exposed area of film has been wound out of the field of exposure and a new sensitive area wound in. In this connection it will be recalled from the previous description that a film locking dog 47 or 47ᵃ is used to cooperate with the perforation in the film at the ends of each exposure area. The coupling member 49 of this dog, which is positioned the same in both roll holders, interlocks with a coupling member 131 on the hub of the stop pawl 120 of the controlling ratchet 117 for cycle clutch 116. Therefore, when the film dog 47 or 47ᵃ falls into a perforation of the film at the end of a picture area that has been fully wound off, it rocks the stop pawl 120 into engagement with the ratchet as shown in Figure 10; this disconnects the large film driving gear 112 from the cycle member and the film feed is terminated automatically for the time being.

The film dog is disengaged or lifted out of the film perforation when the film winding operation is to be started by a cam plate 132 on the outer face of the cycle member 110, the full contour of which cam is shown in dotted lines in Figure 10. This cam rides beneath a pin 133 on the stop pawl 120 and lifts the latter out of engagement with the clutch controlling ratchet wheel 117 whereby the film is unlocked and the clutch of the film winding gear 112 thrown in simultaneously. By the time the film locking dog reaches the next perforation, the cam 132 has passed the pawl which is free to be actuated back by the film dog.

In case the cut film roll holder of Figures 6 and 7 is in use, the knife 61 thereof must be connected up to sever the film at the proper time. For this purpose, the coupling member of the knife automatically interlocks, when the roll holder is applied, with a coupling member 134 of a rock arm 135 pivoted at 136. A connecting rod 137 is adapted to rock this arm once to operate the knife 61 and then return it upon each revolution of a disk 138 carrying a wrist pin 139 on which the connecting rod turns. Referring to Figure 9, the said disk 138 is secured to the hub 140 of a spring motor casing 141 turning on a stud 142 secured in the gear case 108 and it may be here explained that for convenience the transmission gear 130 of the film winding devices is mounted to turn idly on this hub 140. A clock spring 143 is enclosed within the case 141 with its outer end locked thereto and its inner end anchored at 144 to the hub of a pinion 145 so that the spring may be wound from its center and drive the disk 139 from its periphery.

Upon each revolution of the cycle member 110 this motor winding pinion 145 is driven one revolution from pinion 146 secured to the cycle member 110 and through another transmission gear 147 turning on the stud 123. When the motor has been thus wound, a stop pin 148 on the outer side of the motor case is locked by a stop arm 149 pivoted at 150 and having its opposite cam shaped end 151 in a position to be tripped by a pin abutment 152 shown in dotted lines in Figure 10 and in section in Figure 8 on the under face of the cycle member. During the rotary course of the latter, the cut-off motor is thus tripped and then immediately rewound in preparation for the next cycle.

It will be borne in mind that the film severing mechanism is driven through the back gearing in Figure 10, whereas the film feeding mechanism is driven from the front gearing. The action of the spring 143 in turning the motor when the spring is released is very rapid giving a quick oscillation of the shaft 136 through the connecting rod 137 so that the clutch 134 connected to the complementary coupling on the knife shaft 62 will give a very rapid cutting and returning movement of the knife. The pin 152 on the cycle member trips the arm 149, and then instantly releases it so that pin 148 on the motor casing is again confronted with the stop arm when it has completed one rapid revolution. It makes no difference if the winding gear 145 for the motor is still moving when the motor is released as the spring will run ahead of it, and operate the cutting mechanism while there is still a winding tension thereon.

I claim as my invention:

1. In an automatic camera, the combination with a camera body and automatic controlling mechanism associated therewith embodying film feeding means, a clutch controlling the same and means for shifting the clutch, of a detachable roll holder having a film feeding roll and a locking device adapted to engage and lock the film, and coupling members on the feeding roll and locking device adapted to cooperate, respectively, with the film feeding means and the clutch shifting device when the roll holder is applied to the camera.

2. In an automatic camera, the combination with a camera body and automatic controlling mechanism associated therewith embodying a spring motor and means for winding and tripping the same, of a detachable roll holder having a film feeding roll and a severing device in connection therewith, said severing device being provided with a coupling adapted to cooperate with the motor when the roll holder is applied to the camera.

3. In an automatic camera, the combination with automatic controlling mechanism embodying film feeding means and driving mechanism therefor including a ball clutch and a ratchet wheel for shifting the same, of a film locking dog adapted to rock into and out of engagement with the perforations of a film and a stop pawl actuated by the dog on said first mentioned movement to engage the ratchet and shift the clutch.

4. In an automatic camera, the combination with automatic controlling mechanism embodying film feeding means and driving mechanism therefor including a cycle member provided with a cam, a ball clutch through which the latter is driven and a ratchet wheel for shifting the clutch, of a film locking dog adapted to rock into and out of engagement with the perforations of a film and a stop pawl actuated by the dog on said first mentioned movement to engage the ratchet and shift the clutch, said stop pawl being disengaged to disengage the dog from the film by the cam on the cycle member.

5. In an automatic camera, the combination with a roll holder embodying a storage chamber, means for feeding a strip of film into said chamber and a knife for severing the film, of controlling mechanism embodying a spring motor for operating the knife and means for winding and tripping the motor.

6. In an automatic camera, the combination with a roll holder embodying a storage chamber, means for feeding a strip of film into said chamber and a swinging knife for severing the film, of controlling mechanism embodying a spring motor having a crank mechanism connected to operate the knife and means for winding and tripping the motor.

7. In a photographic roll holder, the combination with a roll holding chamber, a curved storage chamber extending longitudinally thereof and also transversely thereof at one end, said transverse portion being provided with an entrance opening, and means for feeding a continuous strip of film from the roll holding chamber through the opening into the storage chamber, of a knife adjacent to said opening for severing the film and means for operating the film feeding means and knife in timed relationship.

8. In a photographic roll holder, the combination with a roll holding chamber, a storage chamber and means for feeding a continuous strip of film from one to the other, of a knife for severing the film after its passage into the storage chamber, and controlling means for operating the film feeding means and knife in timed relationship.

9. In a photographic roll holder, the combination with a roll holding chamber, a storage chamber and means for feeding a continuous strip of film from one to the other, of a knife for severing the film after its passage into the storage chamber and controlling means for operating the film feeding means and knife in timed relationship comprising a spring motor connected to the knife and a cycle member adapted to wind and trip the motor.

BENJAMIN D. CHAMBERLIN.